United States Patent
Darling et al.

(10) Patent No.: US 9,853,310 B2
(45) Date of Patent: Dec. 26, 2017

(54) DISTRIBUTION OF ELECTROLYTES IN A FLOW BATTERY

(71) Applicant: United Technologies Corporation, Farmington, CT (US)

(72) Inventors: Robert Mason Darling, South Windsor, CT (US); Andrew Smeltz, Manchester, CT (US); Sven Tobias Junker, Kensington, CT (US); Michael L. Perry, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/107,499

(22) PCT Filed: Dec. 23, 2013

(86) PCT No.: PCT/US2013/077456
§ 371 (c)(1),
(2) Date: Jun. 23, 2016

(87) PCT Pub. No.: WO2015/099654
PCT Pub. Date: Jul. 2, 2015

(65) Prior Publication Data
US 2016/0315339 A1    Oct. 27, 2016

(51) Int. Cl.
*H01M 8/04791* (2016.01)
*H01M 8/0432* (2016.01)
(Continued)

(52) U.S. Cl.
CPC ..... *H01M 8/04276* (2013.01); *H01M 8/0432* (2013.01); *H01M 8/0444* (2013.01);
(Continued)

(58) Field of Classification Search
None
See application file for complete search history.

(56) References Cited

U.S. PATENT DOCUMENTS 5,318,865 A    6/1994    Kaneko et al.
5,648,184 A    7/1997    Inoue et al.
(Continued)

FOREIGN PATENT DOCUMENTS

JP    S54-19228    7/1979
JP    H02-148659   6/1990
(Continued)

OTHER PUBLICATIONS

International Search Report for PCT Application PCT/US2013/077456 completed Apr. 14, 2014.
(Continued)

*Primary Examiner* — Miriam Stagg
*Assistant Examiner* — Christopher Domone
(74) *Attorney, Agent, or Firm* — Carlson, Gaskey & Olds, P.C.

(57) ABSTRACT

A method of determining a distribution of electrolytes in a flow battery includes providing a flow battery with a fixed amount of fluid electrolyte having a common electrochemically active specie, a portion of the fluid electrolyte serving as an anolyte and a remainder of the fluid electrolyte serving as a catholyte. An average oxidation state of the common electrochemically active specie is determined in the anolyte and the catholyte and, responsive to the determined average oxidation state, a molar ratio of the common electrochemically active specie between the anolyte and the catholyte is adjusted to increase an energy discharge capacity of the flow battery for the determined average oxidation state.

24 Claims, 3 Drawing Sheets

(51) Int. Cl.
- H01M 8/0444 (2016.01)
- H01M 8/18 (2006.01)
- H01M 8/04186 (2016.01)
- H01M 8/04276 (2016.01)
- H01M 8/20 (2006.01)

(52) U.S. Cl.
CPC ... *H01M 8/04186* (2013.01); *H01M 8/04791* (2013.01); *H01M 8/188* (2013.01); *H01M 8/20* (2013.01); *Y02E 60/528* (2013.01)

(56) References Cited

U.S. PATENT DOCUMENTS

| | | | |
|---|---|---|---|
| 9,166,243 | B2 | 10/2015 | Perry |
| 2004/0256247 | A1 | 12/2004 | Carson et al. |
| 2005/0158614 | A1 | 7/2005 | Hennessy |
| 2008/0193828 | A1* | 8/2008 | Sahu .................. B60L 11/1822 429/63 |
| 2008/0274393 | A1 | 11/2008 | Markoski et al. |
| 2008/0292938 | A1 | 11/2008 | Perry et al. |
| 2009/0136789 | A1 | 5/2009 | Pien et al. |
| 2010/0092813 | A1 | 4/2010 | Sahu |
| 2010/0330451 | A1 | 12/2010 | Shinozaki et al. |
| 2012/0321920 | A1* | 12/2012 | Perry ................ H01M 8/04029 429/51 |
| 2013/0084482 | A1 | 4/2013 | Chang et al. |
| 2013/0084506 | A1 | 4/2013 | Chang et al. |
| 2013/0316199 | A1* | 11/2013 | Keshavarz .............. H01M 8/18 429/51 |

FOREIGN PATENT DOCUMENTS

| | | |
|---|---|---|
| JP | 2003157883 | 5/2003 |
| JP | 2003303611 | 10/2003 |
| JP | 2006-156029 | 6/2006 |
| WO | 2012162390 | 11/2012 |
| WO | WO2012162390 | * 11/2012 |

OTHER PUBLICATIONS

International Report on Patentability for PCT Application No. PCT/US2013/077778, dated Apr. 29, 2016.

File History for U.S. Appl. No. 13/513,651 now U.S. Pat. No. 9,166,243 dated Oct. 20, 2015.

Certified Translation. Japanese Publication of Examined Patent Application No. S52-102887 published Jul. 13, 1979.

Certified Translation. Japanese Unexamined Patent Application No. H2-148659 published Jun. 7, 1990.

Certified Translation. Japanese Unexamined Patent Application No. 2006-156029 published Jun. 15, 1990.

Linden, D. and Reddy, T.B. Eds. (2002). Handbook of batteries. New York, NY: McGraw-Hill. pp. 37.12, 18-23, 42.3-13, 43.11-3, Appendix A.

Laramini, J. and Dicks, A. (2003). Fuel cell systems explained. Chichester, England: John Wiley & Sons Inc. pp. xv, xvi, 18-9, 88-9, 94-6.

Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.

Aricò, A.S., Creti, P., Baglio, V., Modica, E., and Antonucci, V. (2000). Influence of flow field design on the performance of a direct methanol fuel cell. Journal of Power Sources vol. 91. 2000. pp. 202-209.

Li, X. and Sabir, I. (2004). Review of bipolar plates in PEM fuel cells: Flow-field designs. International Journal of Hydrogen Energy vol. 30. 2005. pp. 359-371.

Negishi, A. (2003). Redox flow battery. (Certified Translation). Fuel Cells vol. 2(4). 2001 pp. 69-74.

Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.

Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.

Wang, L. and Liu, H. (2004). Performance studies of PEM fuel cells with interdigitated flow fields. Journal of Power Sources vol. 13(2). 2004. pp. 185-196.

Guo, S.M. (2005). The simulation of a PEMFC with an interdigitated flow field design. Computational Science 5th International Conference. May 2005. pp. 104-111.

He, W., Yi, J.S., Nguyen, T.V. (2000). Two-phase flow model of the cathode of PEM fuel ceels using interdigitated flow fields. AlChE Journal vol. 46(10). Oct. 2000. pp. 2053-2064.

Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.

Declaration of Dr. Toru Kato, Ph.D. In re U.S. Pat. No. 9,166,243. Executed Feb. 23, 2017. pp. 1-89.

Prior Art Claim Chart for U.S. Pat. No. 9,166,243.

Ponce de León, C., Frías-Ferrer, A., González-García, Szánto, D.A., and Walsh, F.C. (2006). Redox flow cells for energy conversion. Journal of Power Sources vol. 160. 2006. pp. 716-732.

Negishi, A. (2003). Redox flow battery. Fuel Cells vol. 2(4). 2003. pp. 69-74.

Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.

Shigematsu, T. (2011). Redox flow battery for energy storage. SEI Technical Review No. 73. Oct. 2011. pp. 4-13.

Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.

Hagedorn, N.H. (1984). NASA redox storage system development project. Final Report. DOE/NASA/12726-24. Oct. 1984. pp. 1-43.

Sumitomo Electric. Redox Flow Battery. Technical Document. Retrieved May 8, 2017 from: http://global-sei.com/products/redox/pdf/redox-flow-battery.pdf.

Petition for Inter Partes Review of U.S. Pat. No. 9,166,243. *Sumitomo Electric Industries, Ltd.,* Petitioner, v. *United Technologies Corporation,* Patent Owner. Filed Feb. 23, 2017.

European Search Report for European Patent Application No. 13900022 dated Aug. 4, 2017.

* cited by examiner

US 9,853,310 B2

DISTRIBUTION OF ELECTROLYTES IN A FLOW BATTERY

STATEMENT REGARDING GOVERNMENT SUPPORT

This invention was made with government support under contract DE-AR 0000149 awarded by the United States Department of Energy. The government has certain rights in the invention.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive reversible electrochemical redox reactions.

Upon charging, the electrical energy supplied into the flow battery causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include ions of elements that have multiple, reversible oxidation states and all of which are dissolved or dissolvable in a selected liquid solution.

SUMMARY

Disclosed is a method of determining a distribution of electrolytes in a flow battery. A flow battery is provided with a fixed amount of fluid electrolyte having a common electrochemically active specie. A portion of the fluid electrolyte serves as an anolyte and a remainder of the fluid electrolyte serves as a catholyte. An average oxidation state of the common electrochemically active specie is determined in the anolyte and the catholyte. In response to the determined average oxidation state, a molar ratio of the common electrochemically active specie between the anolyte and the catholyte can be adjusted to increase an energy discharge capacity of the flow battery for the determined average oxidation state.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
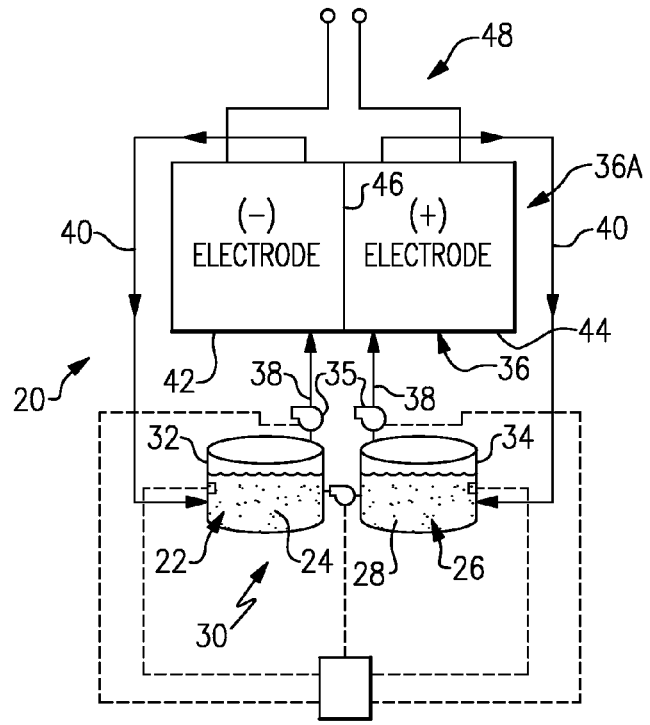
FIG. 1 illustrates an example flow battery.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes a fluid electrolyte 22 (e.g., a first ionic-conductive fluid) that has an electrochemically active specie 24 that undergoes reversible redox reactions. The fluid electrolyte 22 functions in a redox pair with regard to an additional fluid electrolyte 26 (e.g., a second ionic-conductive fluid) that has an electrochemically active specie 28. A fixed amount of the fluid electrolytes 22/26 are used in the flow battery.

The electrochemically active species 24/28 include ions of elements that have multiple, reversible oxidation states in a selected liquid solution, such as but not limited to, aqueous sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof.

The first fluid electrolyte 22 (e.g., the negative electrolyte or anolyte) and the second fluid electrolyte 26 (e.g., the positive electrolyte or catholyte) are contained in a supply/storage system 30 that includes first and second vessels 32/34 and pumps 35. Furthermore, although the examples herein may be described as using, or implied as using, two ionic-conductive fluid electrolytes 22/26, it is to be understood that the examples are also applicable, mutatis mutandis, to the use of one ionic-conductive fluid electrolyte 22 and a non-ionically conductive fluid electrolyte.

The fluid electrolytes 22/26 are delivered from the first and second vessels 32/34, using the pumps 35, to a cell stack 36A of electrochemically active cells 36 (one representative cell shown) of the flow battery 20 through respective feed lines 38. The fluid electrolytes 22/26 are returned from the cell stack 36A to the vessels 32/34 via return lines 40. The feed lines 38 and the return lines 40 interconnect the vessels 32/34 with the electrochemically active cells 36 of the cell stack 36A.

The electrochemically active cells 36 each include a first electrode 42, a second electrode 44 spaced apart from the first electrode 42, and an electrolyte separator layer 46 arranged between the first electrode 42 and the second electrode 44. For example, the electrodes 42/44 are porous carbon structures, such as carbon paper or felt. The electrochemically active cells 36 can also include manifold plates, manifolds and the like for delivering the fluid electrolytes 22/26 to the electrodes 42/44. It is to be understood, however, that other configurations can be used. For example, the electrochemically active cells 36 can alternatively be configured for flow-through operation where the fluid electrolytes 22/26 are pumped directly into and through the electrodes 42/44 without the use of adjacent flow field channels.

The electrolyte separator layer 46 can be an ion-exchange membrane, an inert micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states.

The fluid electrolytes 22/26 are delivered to the electrochemically active cells 36 to either convert electrical energy into chemical energy or, in the reverse reaction, convert chemical energy into electrical energy that can be discharged. The electrical energy is transmitted to and from the electrochemically active cells 36 through an electric circuit 48 that is electrically coupled with the electrodes 42/44.

The energy discharge capacity for the given flow battery 20 and fixed amount of anolyte/catholyte can decrease over time due to several factors. One factor is the net transport of the electrochemically active species 24/28 and/or supporting electrolyte across the electrolyte separator layer 46, called crossover (see also FIG. 3), resulting in a change in volume ratio and/or difference in active specie concentration between anolyte and catholyte vessels 32/34. Another factor is side reactions that occur within the flow battery 20. The average oxidation state of the electrochemically active species 24/28 can change over time because of these side reactions, including but not limited to hydrogen evolution and specie oxidation. If left unmitigated, either process can alter the optimum volumetric distribution of electrolyte 22/26 for achieving maximum energy capacity and potentially reduce the flow battery lifetime. The tendency of the active specie concentration to shift over time can be reversed by partial or complete mixing of the fluid electrolytes 22/26 and then redistributing them appropriately into the flow battery vessels 32/34. For example, if complete mixing was performed, each tank would receive equal volumes of electrolyte to balance the moles of the active specie in each vessel 32/34. Reversal of the average oxidation state, however, can only be performed by chemical treatment or auxiliary electrochemical processes. If the average oxidation state has shifted or if the mixing was incomplete such that there remains a difference in concentration in the two fluid electrolytes 22/26, using equal volumes of the fluid electrolytes 22/26 may not provide an optimal energy capacity. In other words, there is a different volume ratio of the electrolytes 22/26 that increases the energy discharge capacity toward a maximum for the given average oxidation state and active specie concentration ratio between vessels 32/34.

Figure 2:
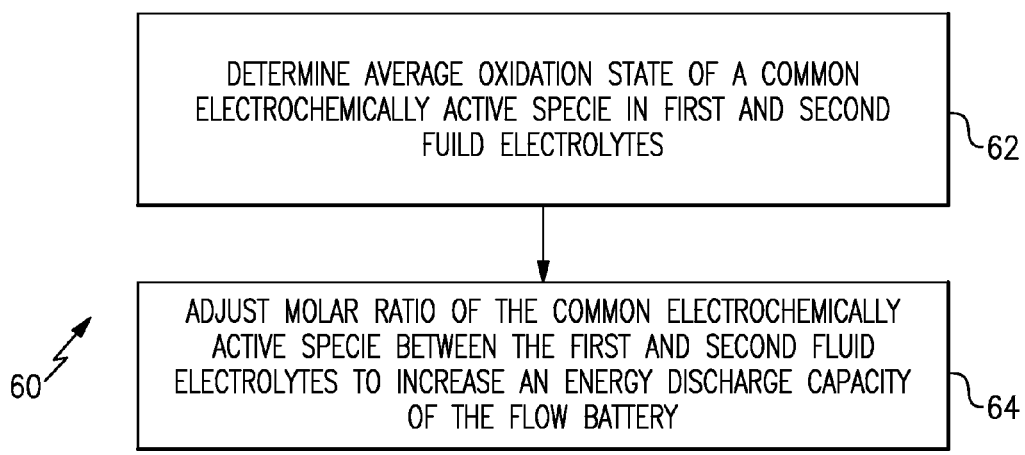
FIG. 2 is an example method of determining a distribution of electrolytes in a flow battery.

In view of the above-described shift in average oxidation state, FIG. 2 shows an example method 60 for determining a proper distribution of the fluid electrolytes 22/26 in the flow battery 20 for a given fixed amount of the fluid electrolytes 22/26. In this example, the method 60 includes a determination step 62 and an adjustment step 64. In the determination step 62, the average oxidation state of the common electrochemically active specie is determined in the first and second fluid electrolytes 22/26. In response to the determined average oxidation state, a molar ratio of the common electrochemically active species 24/28 between the first and second fluid electrolytes 22/26 is adjusted in order to increase the energy discharge capacity of the flow battery 20 for the determined average oxidation state. The concentration of active specie in each vessel 32/34 is then used to convert the molar ratio into a volume ratio. In the case of equal concentrations, the mole ratio is equivalent to the volume ratio.

In one example based on vanadium, the fully balanced average oxidation state is +3.5 based upon the use of $V^{2+}/V^{3+}$ and $V^{4+}/V^{5+}$ (which can also be denoted as V(ii)/V(iii) and V(iv)/V(v), although the valences of the vanadium species with oxidation states of 4 and 5 are not necessarily 4+ and 5+) as the electrochemically active species 24/28. For example, if the electrolyte solution is aqueous sulfuric acid, then the V(iv)/V(v) species will be present as $VO^{2+}$ and $VO_2^+$, respectively.

The average oxidation state of the electrochemically active species 24/28 can be determined either directly or indirectly. If determined directly, the average oxidation state can be determined from measurements of molar concentrations of different oxidation states of the electrochemically active species 24/28. In one example based on vanadium as the common electrochemically active species 24/28, the oxidation states include $V^{2+}/V^{3+}$ and $V^{4+}/V^{5+}$. In one further example, the molar concentrations of the different oxidation states of the electrochemically active species 24/28 can be obtained using an optical detector device that collects molar concentration measurements of the electrochemically active species 24/28 in one or both of the vessels 32/34. For example, the optical detector device utilizes light absorption to detect molar concentration. Once the molar concentrations are obtained, the average oxidation state can be determined as a function of the molar concentrations divided by a total molar amount of the electrochemically active species 24/28. In one further example based upon vanadium, the average oxidation state can be determined according to Equation I:

$$\bar{v} = \frac{(2c_{2+} + 3c_{3+})V_- + (4c_{4+} + 5c_{5+})V_+}{N_{T,0}} \qquad \text{Equation I}$$

In Equation I, $\bar{v}$ represents the average oxidation state, $c_{2+}$ represents the concentration of V(ii), $c_{3+}$ represents the concentration of V(iii), $c_{4+}$ represents the concentration of V(iv), $c_{5+}$ represents the concentration of V(v), and $N_{T,0}$ represents the total moles of the electrochemically active species 24/28. Similarly, the average oxidation state can be determined for an electrochemically active specie based on iron or chromium or other common specie.

The average oxidation state can alternatively be determined by directly measuring the concentrations of the different oxidation states using other analytical methods such as, but not limited to, potentiostatic titration, although the titration technique is not a real-time measurement and can, therefore, potentially introduce a time lag.

Alternatively or in addition to determining the average oxidation state directly, the average oxidation state can be determined indirectly from other properties of the fluid electrolytes 22/26. For example, measurements can be collected for conductivity, density, viscosity, or combinations thereof, of the fluid electrolytes 22/26. The conductivity, density and/or viscosity can be correlated experimentally to the average oxidation state of the electrochemically active species 24/28. In addition, changes in the key battery performance metrics during use such as energy capacity or cell-stack resistance relative to an initial value can be correlated to average valance. Thus, these indirect measurements can also be used to determine the average oxidation state, or alternatively to verify direct measurements.

Once the average oxidation state is determined, the mole fraction ratio can be adjusted according to step 64 of method 60. As an example, the optimal mole fraction of the negative active specie, R, is represented by Equation II:

$$R = N^-/(N^- + N^+) = (5 - \bar{v})/3 \qquad \text{Equation II}$$

In Equation II, $N^-$ is moles of the common electrochemically active specie in the anolyte and $N^+$ is moles of the common electrochemically active specie in the catholyte and $\bar{v}$ is the average oxidation state determined using Equation I. The molar fraction is then converted into a volume fraction by knowing or estimating the total concentration of active specie in each reservoir.

Table 1 below shows examples of how electrolyte active specie distribution provide higher or lower discharge capacity relative to a theoretical maximum capacity based upon a fully balanced molar ratio of the electrolytes 22/26 and fully balanced average oxidation state. The example is based on the use of vanadium as the common electrochemically active specie, but it is to be understood that the examples herein could also be applied to other electrochemically active species.

In the table, $\bar{v}$ is the average oxidation state, $N^-/N_T$ is the molar fraction of the anolyte, "v−" and "v+" are, respectively, the average oxidation states of each of the electrolytes 22/26, $Q/Q_{max}$ is the relative energy discharge capacity and "best" is the theoretical optimal molar ratio that provides the theoretical highest relative energy discharge capacity for the given average oxidation state using Equation II.

As can be seen in Table I by comparison of the two rows where the average oxidation state is 3.7, a mole fraction of $N^-$ of 0.5 is expected to yield a relative energy discharge capacity of 0.6. However, a lower mole fraction of 0.43 is expected to yield a higher relative energy discharge capacity of 0.86. Thus, for an average oxidation state of 3.7, a rebalancing of the moles of the electrolytes 22/26 to equal amounts (a 0.5 fraction) would not provide the maximum relative energy discharge capacity. Thus, according to the method 60, the molar ratio can be adjusted (i.e., non-equal volumes) to achieve the increased relative energy discharge capacity. In the above examples, the determination of $Q_{max}$ using Equation II assumes that the battery is taken to 100% state of charge of the fluid electrolytes 22/26 during operation.

TABLE I

Electrolyte Volumes v. Relative Energy Discharge Capacity

| $\bar{v}$ | $N^-/N_T$ | v− | v+ | Q/Qmax | Best ($N^-/N_T$) |
|---|---|---|---|---|---|
| 3.5 | 0.5 | 2 | 5 | 1 | 0.5 |
| 3.7 | 0.5 | 2.4 | 5 | 0.6 | 0.43 |
| 3.7 | 0.43 | 2 | 5 | 0.86 | 0.43 |

Figure 5:
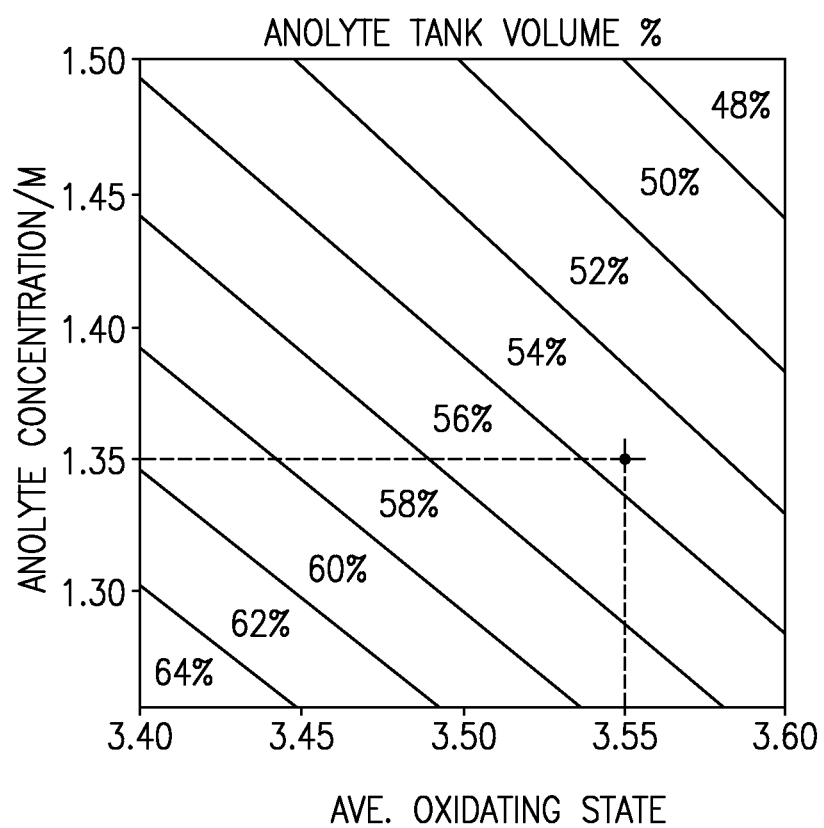
FIG. 5 is a graph of anolyte concentration versus average oxidation state to show anolyte vessel volume percent.

Additionally, the approach for distributing the electrolytes in the flow battery 20 may be determined based upon a practical state-of-charge range along with other operating parameters and characteristics of the flow battery 20. For example, a baseline approach for the distribution of electrolytes 22/26 in the flow battery 20 assumes that 100% state-of-charge is reached on the anolyte and catholyte at full charge. However, practical limitations or desired operating requirements, such as but not limited to cell voltage limits on charge and discharge, maximum pumping rates, minimum round-trip energy efficiency and conditions that lead to electrode decay, can limit the practical or usable range of state of charge upon charge and discharge. Thus, in some instances, adjusting the volumes or moles of the electrolytes 22/26 based upon an assumption that 100% state of charge is reached is not practical and would lead to volumes or ratios that are inefficient because 100% state of charge is never actually reached. As an example, if the state of charge is less than 100% on "full" charge and greater than 0% on "full" discharge, such as 80%-20%, the volume ratio of the anolyte one of the electrolytes 22/26 can be selected according to the chart shown in FIG. 5. In this example, the chart assumes an initial average concentration of 1.5 M. Thus, for a given anolyte concentration and average oxidation state of the electrolytes 22/26, there is a selected volume percent of the anolyte that can be used. For example, an anolyte concentration of 1.35 and an average oxidation state of 3.55 would fall close to the 54% band, indicating that the volume ratio should be selected such that 54% of the overall volume of the electrolytes 22/26 is in the anolyte vessel 32.

Figure 3:
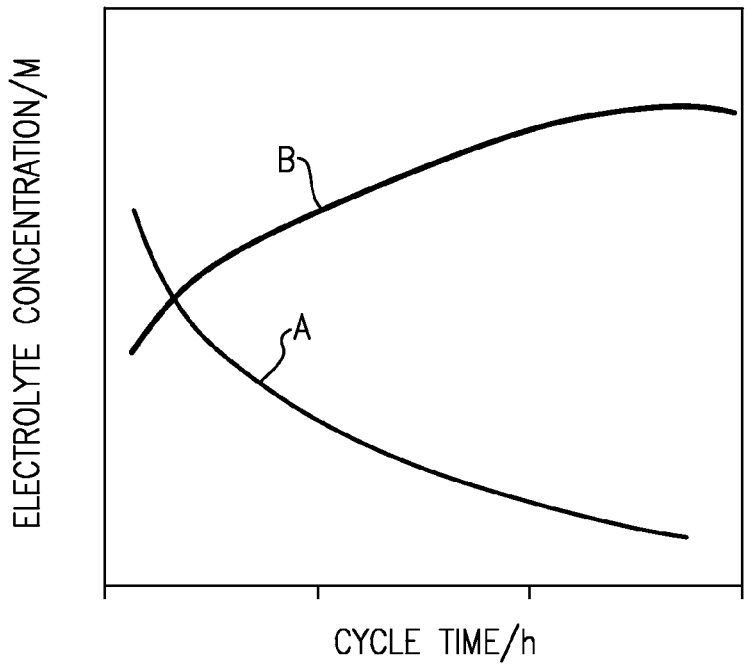
FIG. 3 is a graph of electrolyte concentration versus cycle time.

FIG. 3 shows a graph of electrolyte concentration versus flow battery cycle time. In the graph, line A represents the electrolyte concentration in the anolyte and line B represents the electrolyte concentration in the catholyte. As shown, the concentration in the anolyte typically decreases over time while the concentration in the catholyte increases over time. This represents the net effect of transport of the active electrolyte species and supporting electrolyte through the cell membrane over time, with increasing number of charge/discharge cycles.

The adjustment of the volume ratio can also involve partial mixing of the electrolytes 22/26. The partial mixing can serve dual purposes, including the adjustment of the volumes or number of moles in each of the vessels 32/34 to increase energy discharge capacity and also to re-equalize the concentration of vanadium in the two electrolytes 22/26 from crossover. This may also serve to prevent the electrochemically active specie from precipitating as well as limit efficiency loss due to dilution of the anolyte.

Figure 4:
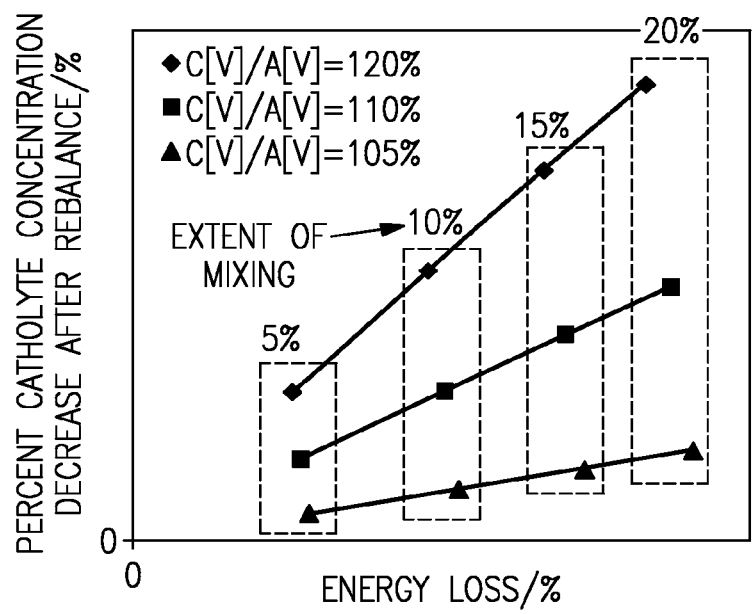
FIG. 4 is a graph of percent catholyte concentration versus energy loss.

Additionally, the timing and the extent of re-equalization of the active specie concentration can be determined beforehand for the purpose of reducing or even minimizing the energy penalty from mixing the electrolytes 22/26 while increasing or maximizing the percentage decrease in concentration of the catholyte, as represented in FIG. 4. As an example, the graph in FIG. 4 shows the change in vanadium concentration with mixing percentage for different concentrations of catholyte before mixing. The top line with the greatest slope indicates a more energy-efficient rebalance of the electrolytes 22/26. This indicates that the rebalancing or mixing between the electrolytes 22/26 would be more energy efficient when the catholyte concentration is as high as possible. Further, the near-linear relationship between extent of mixing and energy penalty shows that there is no inherent efficiency benefit to mixing in larger percentages versus smaller ones.

In one example, the decision to reverse the effects of crossover, the timing and extent of mixing can be implemented at a specific practical condition based upon the catholyte concentration and/or other conditions or system performance characteristics which impact efficiency. For instance, the adjustment may be conducted only if a concentration of the electrochemically active specie 24/28 in one of the electrolytes 22/26 exceeds a defined threshold. The extent of mixing may be a small percentage such that rebalancing occurs more frequently or a larger percentage and less frequently as this parameter does not impact efficiency directly. Other factors and performance characteristics of the flow battery should be considered in determining the timing and extent of mixing.

Alternatively or in addition to using a defined threshold, the adjustment can be conditioned upon an external environmental air temperature around the flow battery 20. For example, a partial mixing of the charged electrolytes 22/26 results in heat release into the electrolyte which must be rejected through active heat exchange with the surrounding environment. Thus, the ability of the flow battery 20 to reject heat to the surrounding environment is reduced when the surrounding air temperature is high. By choosing a day/time with a relatively low surrounding air temperature, there is greater ability of the flow battery heat rejection system to reject the heat losses to the surrounding air and thus the overall mixing process is made more efficient. The mixing can also be performed when the electrolyte temperature is relatively low to avoid having to actively cool the system after mixing.

Additionally, the degree or amounts of the electrolytes 22/26 that are mixed can be limited, to prevent full conversion of $V^{+5}$ and $V^{+2}$ in the electrolytes 22/26. This avoids relatively large energy losses during charging due to high over-potentials and potential precipitation of contaminant species. In one example, the partial mixing of the electrolytes 22/26 is conducted according to one of two different techniques. In the first technique, a portion or aliquot of the anolyte is moved into the catholyte and then a portion or aliquot of a different size of the catholyte is moved into the anolyte to balance the number of moles as described above. In the second technique, portions or aliquots of the electrolytes are moved simultaneously between the vessels 32/34.

Additionally, because the crossover of the electrochemically active species typically occurs from the anolyte to the catholyte, the catholyte concentration increases over time while the anolyte concentration decreases over time. Thus, the volume requirements for the anolyte will be greater than for the catholyte. In terms of the vessels 32/34, the volumetric sizes of these vessels 32/34 can be selected, at least in part, according to a state of charge range of the flow battery 20. In the example above described with reference to FIG. 5 based upon a range of 80%-20%, the percentage of the anolyte of the volume can range up to 64%. Thus, when determining the volumetric sizes of the vessels 32/34, either a larger vessel should be provided for the anolyte or, if the vessels are to be the same size, the size should be selected for the expected maximum amount of anolyte that is to be used. Other factors or variables may also play into the determination of the tank sizes and volume ratios, such as the species selected for the electrochemically active specie, minimum and maximum pumping rates, desired efficiencies, electro-kinetics, specie solubility, and the like.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of determining a distribution of electrolytes in a flow battery, the method comprising:
   (a) providing a flow battery with a fixed amount of fluid electrolyte having a common electrochemically active specie, the common electrochemically active specie having multiple reversible oxidation states, a portion of the fluid electrolyte serving as an anolyte and a remainder of the fluid electrolyte serving as a catholyte;
   (b) determining an instant average oxidation state of the common electrochemically active specie in the anolyte and the catholyte; and
   (c) responsive to the determined instant average oxidation state, adjusting an instant molar ratio of the common electrochemically active specie between the anolyte and the catholyte to increase a relative energy discharge capacity of the flow battery for the determined instant average oxidation state, the relative energy discharge capacity being an instant energy discharge capacity based on the instant molar ratio relative to a maximum capacity based on a fully balanced molar ratio between the anolyte and the catholyte, and wherein the adjusting includes partially mixing the anolyte and the catholyte together into non-equal volumes of the anolyte and the catholyte in the flow batter.

2. The method as recited in claim 1, wherein the anolyte and the catholyte define a fully balanced average oxidation state with respect to equal molar ratios of the anolyte and the catholyte, and the determined instant average oxidation state is different than the fully balanced average oxidation state.

3. The method as recited in claim 2, wherein the instant molar ratio is represented by $N^-/(N^-+N^+)$, where $N^-$ is moles of the common electrochemically active specie in the anolyte and $N^+$ is moles of the common electrochemically active specie in the catholyte, and the adjusted molar ratio is less than or greater than 0.5.

4. The method as recited in claim 1, wherein said step (b) is conducted at a 100% state of charge of the anolyte and the catholyte.

5. The method as recited in claim 1, wherein said step (c) includes adjusting the instant molar ratio such that the increased relative energy discharge capacity of the flow battery is less than a full energy discharge capacity of the flow battery at the fully balanced average oxidation state with respect to equal molar ratio of the anolyte and the catholyte.

6. The method as recited in claim 1, including mixing less than 50 vol % of the anolyte with the catholyte and then mixing less than 50 vol % of the catholyte with the anolyte.

7. The method as recited in claim 1, wherein the common electrochemically active elemental specie is selected from the group consisting of vanadium, iron, and chromium.

8. The method as recited in claim 1, wherein said step (b) includes directly determining the instant average oxidation state from concentrations of different oxidation states of the common electrochemically active elemental specie in the anolyte and the catholyte.

9. The method as recited in claim 1, wherein said step (b) includes determining the instant average oxidation state as a function of molar concentrations of different oxidation states of the common electrochemically active elemental specie in the anolyte and the catholyte divided by a total molar amount of the common electrochemically active elemental specie.

10. The method as recited in claim 1, wherein said step (b) includes collecting measurements representing volumes of the anolyte and the catholyte and concentrations of different oxidation states of the common electrochemically active specie in the anolyte and the catholyte.

11. The method as recited in claim 10, wherein the measurements are selected from the group consisting of optical measurements, conductivity measurements, density measurements, viscosity measurements, and combinations thereof.

12. The method as recited in claim 1, further including adjusting the instant molar ratio in response to a concentration of the common electrochemically active specie in one of the anolyte and the catholyte exceeding a defined threshold.

13. The method as recited in claim 1, further including adjusting the instant molar ratio in response to an external environmental air temperature of the flow battery being below a defined threshold.

14. The method as recited in claim 1, wherein said step (c) includes partially mixing the anolyte and the catholyte together as a function of an external environmental air temperature of the flow battery such that volumes that are mixed are inversely related to the external environmental air temperature.

15. The method as recited in claim 1, further including adjusting the volume ratio of the anolyte according to volume ration bands on a chart of anolyte concentration versus average oxidation state, wherein the volume ratio is adjusted to the volume ratio band that contains a plot point of an instant anolyte concentration and instant average oxidation average oxidation state.

16. The method as recited in claim 1, wherein the flow battery includes a supply/storage system external of the at least one electrochemical cell, the supply/storage system including first and second vessels fluidly connected with the at least one electrochemical cell, the first and second vessel having respective volumetric sizes, wherein at least one of the volumetric sizes is selected, at least in part, according to a state of charge range of the flow battery.

17. The method as recited in claim 16, wherein the state of charge range of the flow battery is from a first value that is less than 100% charge to a second value that is greater than 0% discharge.

18. The method as recited in claim 16, wherein the state of charge range of the flow battery is 80% charge to 20% discharge.

19. The method as recited in claim 1, including mixing less than 50 vol % of the anolyte with the catholyte and then mixing less than 50 vol % of the catholyte with the anolyte, and the common electrochemically active elemental specie is vanadium.

20. The method as recited in claim 19, further including adjusting the instant molar ratio in response to a concentration of the common electrochemically active specie in one of the anolyte and the catholyte exceeding a defined threshold.

21. The method as recited in claim 20, wherein the instant molar ratio is represented by $N^-/(N^-+N^+)$, where $N^-$ is moles of the common electrochemically active specie in the anolyte and $N^+$ is moles of the common electrochemically active specie in the catholyte, and the adjusted molar ratio is less than or greater than 0.5.

22. The method as recited in claim 20, wherein said step (c) includes adjusting the instant molar ratio such that the increased relative energy discharge capacity of the flow battery is less than a full energy discharge capacity of the flow battery at the fully balanced average oxidation state with respect to equal molar ratio of the anolyte and the catholyte.

23. A method of determining a distribution of electrolytes in a flow battery, the method comprising:
(a) providing a flow battery with a fixed amount of fluid electrolyte having electrochemically active species, the electrochemically active species having multiple reversible oxidation states, a portion of the fluid electrolyte serving as an anolyte and a remainder of the fluid electrolyte serving as a catholyte;
(b) determining an instant average oxidation state of the electrochemically active species in the anolyte and the catholyte; and
(c) responsive to the determined instant average oxidation state, adjusting an instant molar ratio of the electrochemically active species between the anolyte and the catholyte to increase a relative energy discharge capacity of the flow battery for the determined instant average oxidation state, the relative energy discharge capacity being an instant energy discharge capacity based on the instant molar ratio relative to a maximum capacity based on a fully balanced molar ratio between the anolyte and the catholyte, and wherein the adjusting includes partially mixing the anolyte and the catholyte together into non-equal volumes of the anolyte and the catholyte in the flow battery.

24. A method of determining a distribution of electrolytes in a flow battery, the method comprising:
(a) providing a flow battery with a fixed amount of fluid electrolyte having electrochemically active vanadium species, the electrochemically active vanadium species having multiple reversible oxidation states, a portion of the fluid electrolyte serving as an anolyte and a remainder of the fluid electrolyte serving as a catholyte;
(b) determining an instant average oxidation state of the electrochemically active vanadium species in the anolyte and the catholyte; and
(c) responsive to the determined instant average oxidation state, adjusting an instant molar ratio of the electrochemically active vanadium species between the anolyte and the catholyte to increase a relative energy discharge capacity of the flow battery for the determined instant average oxidation state, the relative energy discharge capacity being an instant energy discharge capacity based on the instant molar ratio relative to a maximum capacity based on a fully balanced molar ratio between the anolyte and the catholyte, and wherein the adjusting includes partially mixing the anolyte and the catholyte together into non-equal volumes of the anolyte and the catholyte in the flow battery.

* * * * *

UNITED STATES PATENT AND TRADEMARK OFFICE
CERTIFICATE OF CORRECTION

PATENT NO. : 9,853,310 B2
APPLICATION NO. : 15/107499
DATED : December 26, 2017
INVENTOR(S) : Robert Mason Darling et al.

Page 1 of 1

It is certified that error appears in the above-identified patent and that said Letters Patent is hereby corrected as shown below:

On the Title Page

In item (71) Applicant, Line 2; replace "Farmington" with --Hartford--

In the Claims

In Claim 1, Column 8, Line 31; replace "batter" with --battery--

In Claim 15, Column 9, Line 30; replace "volume ration bands" with --volume ratio bands--

Signed and Sealed this
Twenty-second Day of October, 2019

Andrei Iancu
*Director of the United States Patent and Trademark Office*